(12) United States Patent
Steffens et al.

(10) Patent No.: US 7,536,797 B2
(45) Date of Patent: May 26, 2009

(54) SPIRIT LEVEL

(75) Inventors: Markus Steffens, Winnweiler (DE); Gabriel Kallabis, Spirkelbach (DE)

(73) Assignee: Stabila Messgerate Gustav Ullrich GmbH, Annweiler am Trifels (DE)

( * ) Notice: Subject to any disclaimer, the term of this patent is extended or adjusted under 35 U.S.C. 154(b) by 342 days.

(21) Appl. No.: 10/597,643

(22) PCT Filed: Mar. 11, 2005

(86) PCT No.: PCT/EP2005/002607

§ 371 (c)(1),
(2), (4) Date: Aug. 2, 2006

(87) PCT Pub. No.: WO2005/088256

PCT Pub. Date: Sep. 22, 2005

(65) Prior Publication Data

US 2008/0216332 A1 Sep. 11, 2008

(30) Foreign Application Priority Data

Mar. 12, 2004 (DE) .............. 10 2004 012 585
Apr. 27, 2004 (DE) .............. 20 2004 006 643 U

(51) Int. Cl.
*G01C 9/24* (2006.01)

(52) U.S. Cl. .......................... 33/365; 33/379

(58) Field of Classification Search ............ 33/365, 33/377, 379, 381, 382, 451
See application file for complete search history.

(56) References Cited

U.S. PATENT DOCUMENTS

| 5,651,186 A * | 7/1997 | Lindner et al. | 33/377 |
| 6,675,490 B1 * | 1/2004 | Krehel et al. | 33/382 |
| 6,792,686 B2 * | 9/2004 | Krehel et al. | 33/382 |
| 6,915,586 B2 * | 7/2005 | Hickey | 33/382 |
| 6,957,494 B1 * | 10/2005 | Foran | 33/379 |
| 6,988,320 B2 * | 1/2006 | Kallabis et al. | 33/365 |
| 7,024,781 B1 * | 4/2006 | Cowie | 33/348 |
| D525,543 S * | 7/2006 | Kallabis | D10/69 |
| 7,073,270 B2 * | 7/2006 | Kim | 33/451 |
| 7,086,167 B2 * | 8/2006 | Foran | 33/379 |
| 7,150,106 B2 * | 12/2006 | Kallabis et al. | 33/365 |
| 7,150,107 B2 * | 12/2006 | Kim | 33/451 |
| D535,576 S * | 1/2007 | Schafer et al. | D10/69 |
| 7,204,029 B2 * | 4/2007 | Tran et al. | 33/451 |
| 7,228,637 B2 * | 6/2007 | Kim | 33/451 |
| 7,290,346 B2 * | 11/2007 | Szumer et al. | 33/374 |
| 7,316,074 B2 * | 1/2008 | Tran et al. | 33/451 |
| 7,363,719 B2 * | 4/2008 | Levinson et al. | 33/384 |
| 2003/0163927 A1 * | 9/2003 | Kallabis et al. | 33/365 |
| 2005/0039341 A1 * | 2/2005 | Hickey | 33/365 |

(Continued)

FOREIGN PATENT DOCUMENTS

DE    7704713    8/1977

(Continued)

*Primary Examiner*—Yaritza Guadalupe-McCall
(74) *Attorney, Agent, or Firm*—Dennison, Schultz & MacDonald

(57) ABSTRACT

The invention relates to a spirit level comprising a spirit level body (10) which is made from a spray-injected thermoplastic material with at least one recess (22) for a spirit level. In order to embody the spirit level body (10) such that it is long but without drawing said body, a reinforcing insert (32) made of fiber-reinforced plastic is injected around inside the spirit level body (10).

16 Claims, 2 Drawing Sheets

U.S. PATENT DOCUMENTS

| | | | |
|---|---|---|---|
| 2005/0229412 A1* | 10/2005 | Foran | 33/365 |
| 2006/0143933 A1* | 7/2006 | Kallabis et al. | 33/451 |
| 2007/0175056 A1* | 8/2007 | Tran et al. | 33/451 |
| 2007/0266577 A1* | 11/2007 | Tran | 33/379 |
| 2009/0029122 A1* | 1/2009 | Krause | 428/198 |

FOREIGN PATENT DOCUMENTS

| | | |
|---|---|---|
| DE | 69022596 | 3/1996 |
| DE | 69905557 | 8/2003 |

\* cited by examiner

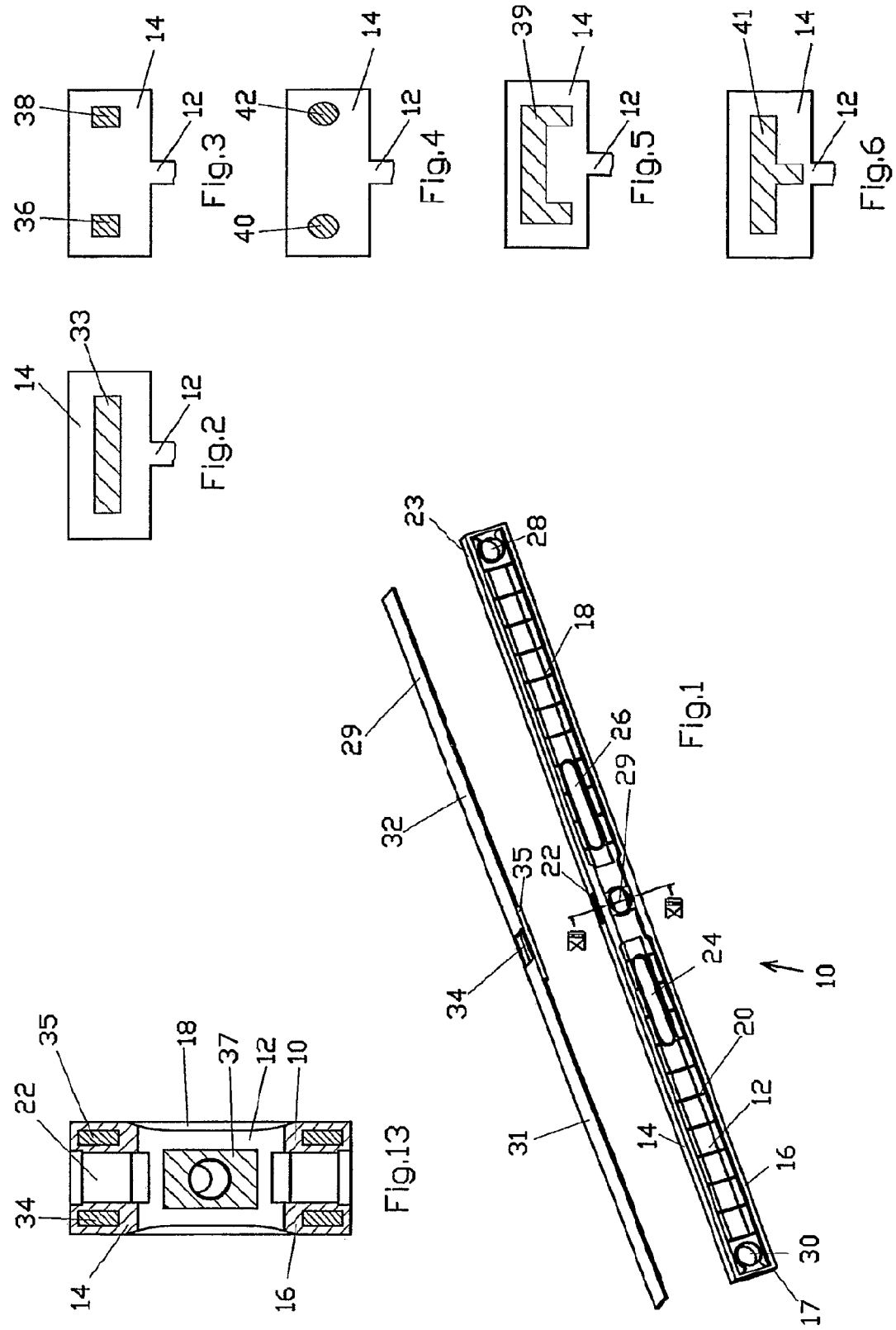

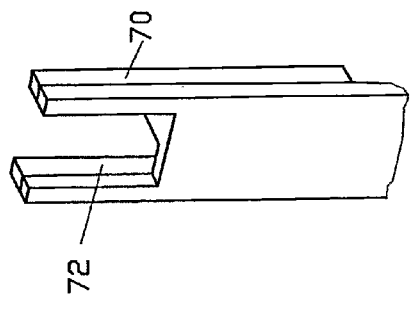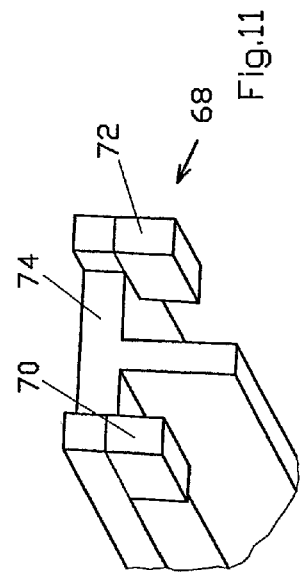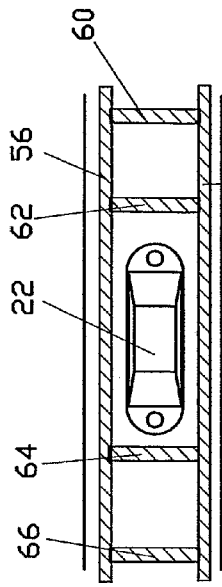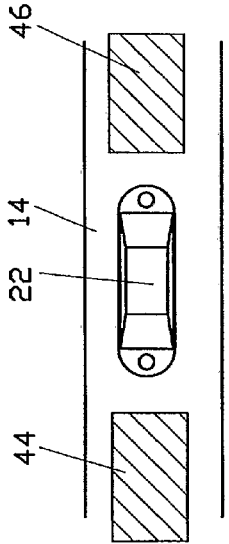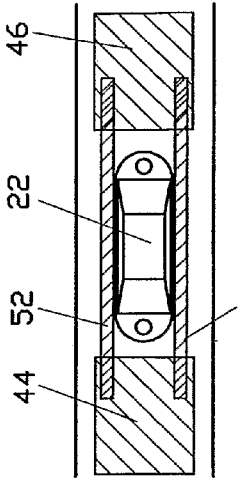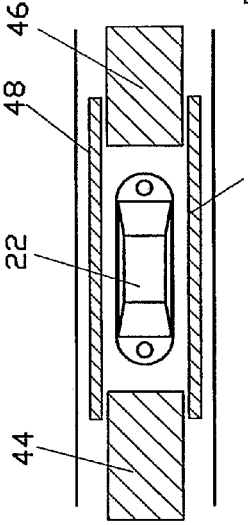

SPIRIT LEVEL

The invention involves a level including a level body of plastic made from thermoplastic material by means of injection molding with at least one recess for a position sensor, like a bubble level.

BACKGROUND OF THE INVENTION

A plastic level is known from AT-U-006 006. In order to construct this level in a relatively long manner without accepting impermissible distortion, the level is molded using the internal gas pressure procedure.

It is also known how to produce levels by means of a foam injection molding procedure, in order to minimize the distortion. The disadvantage of this procedure, however, is a lower surface quality, so that basic reprocessing is required.

Known from DE-U-77 04 713 is a level whose body consists of a plastic profile. Metal inserts, which are molded or inserted into the plastic profile, extend inside the plastic profile basically over the entire length of the level body. There is also the possibility of constructing the level body by extrusion, wherein the metal inserts are pulled into the body by jets. In another embodiment, a hollow box profile is used to construct the level body, on the interior side of which profile recesses can be present into which metal inserts can be placed.

The metal inserts can also be molded in during the injection molding of the level body or can be pushed into the previously named recesses after molding the body of the level.

A level body is produced by injection molding according to DE-T-699 05 557. In order to fix the bubble level, it is accepted into a metal frame, which can be placed in an injection molding tool.

A level made of a thermoset resin mixed with glass particles is known from DE-T-690 22 596.

A level is known from U.S. Pat. No. 3,921,306 and U.S. Pat. No. 3,889,353 whose body is made of high density urethane foam. Extending along the working surfaces of the level all the way to the edges are metal inserts, which have a Y-shaped geometry in a cut-away view in the area of the working surfaces. Because of the profile geometry and the course of the metal frame, recesses for receiving the bubble levels are provided exclusively in the rib of the level.

SUMMARY OF THE INVENTION

The object of the present invention is basically to provide a plastic level of the type named at the outset, which has, even with longer lengths, sufficient stiffness and thus measuring accuracy without requiring any expensive manufacturing processes.

To solve the problem, the invention basically envisions a level with a level body manufactured by injection molding of thermoplastic material with at least one recess for a position sensor, like a bubble level, as well as a reinforcing insert of fiber reinforced plastic with overmoldings by the thermoplastic material in at least some areas, wherein the reinforcing insert is furthermore homogeneously or materially joined to the body of the level.

In the process, the reinforcing insert is made of glass fiber or carbon fiber reinforced plastic. In particular a fiber-reinforced plastic is used for the reinforcing insert, which comprises uninterrupted fibers along the entire length of the insert or sections thereof. Thus textile rovings or textile semi-finished products are used, such as wovens or fabrics, which are embedded in a plastic matrix.

The body of the level itself is preferably made of glass fiber or carbon fiber reinforced plastic, wherein the fibers can also be long fibers, e.g., with a length up to 10 mm.

Independent thereof, it is important to ensure that the level body and the reinforcing insert have the same matrix, which is made of a polyamide or comprises it.

The reinforcing insert should have a modulus of elasticity of E>>70 GPa, in particular E>200 GPa, preferably E>400 GPa.

Based on the teaching of the invention, a plastic level has been made available, which can exceed the previously customary lengths by quite a lot without any loss having to be accepted with respect to measurement accuracy. This is due to the fact that the reinforcing insert extends in the longitudinal direction of the level body, especially in the upper or lower longitudinal edge area and along the entire length. In the process, the reinforcing insert is so geometrically designed that a recess starts in the usual manner from the narrow side of the level body opposite the measurement base, in which recess a bubble level is placed. An appropriate recess can be provided even in the measurement base.

According to the invention, a plastic level is provided, which has comparable rigidity values as aluminum die-cast levels, without requiring subsequent machining and coating of the level body.

Preferably the reinforcing insert is a profile element, like a U or T or E profile. A rectangular profile, however, can also be possible, to name only some examples of profile geometries.

In order to impart sufficient stiffness in the area of the recess of the level body that receives the position sensor, another embodiment of the invention provides that first and second reinforcing inserts extend in the longitudinal direction of the level body when viewed in front of and behind of the narrow side of the level body disposed opposite the measurement base and/or of the recess starting from the measurement base. In another embodiment, third and fourth reinforcing inserts or strips above and/or below and on both sides of the recess or the cut can be overmolded with the thermoplastic material, wherein, if necessary, the third and fourth reinforcing inserts can be connected, such as welded, to the first and second reinforcing inserts. There is also the possibility of positioning the first and second reinforcing strips at least in a longitudinal direction, but preferably in both longitudinal areas of the level body and along the sides of the recess. In the case of two reinforcing strips, additional reinforcing strips extending transversely thereto should be connected to them.

Preferably the level body has the geometry of an I-profile with upper and lower flanges, wherein a reinforcing insert is provided at least in one, but preferably in each flange and extending in the longitudinal direction. In the process, the middle leg of the T-profile runs along the rib that reduces the flanges of the I-profile.

It is provided in particular that the reinforcing insert extends along the longitudinal axis of the level body and over its entire or substantially entire length, particularly along the upper and/or lower longitudinal edge areas, which are defined on the external side by the measurement base and the narrow side of the level body opposite thereto, wherein in front of and behind the recess for the position sensor, which recess starts from the narrow side,—as viewed in the longitudinal direction of the level body—a first reinforcing insert is molded into the level body preferably in the shape of a T-profile and the first reinforcing insert is connected to a second reinforcing insert extending at least on one side of the recess and/or below the recess.

The first reinforcing inserts are connected via a second reinforcing insert extending below a bubble level offset upwardly, namely in the direction of the outermost narrow side. Through these measures, the level body is given a high connection stiffness, without resulting in usage-related changes in relation to the arrangement of the bubble levels in comparison with known level bodies made of metal.

In addition, the level should be constructed symmetrically with respect to the arrangement of the reinforcing inserts.

BRIEF DESCRIPTION OF THE DRAWINGS

Other details, advantages and characteristics of the invention can be seen not only in the claims and the characteristics to be taken from them, either alone or in combination, but also in the following description of the preferred exemplary embodiments depicted in the drawings.

Shown are:

FIG. 1: an exploded perspective view of a level body with the associated reinforcing insert;

FIGS. 2-6: Cross-sections of reinforcing inserts in the area of a flange of a level;

FIGS. 7-10: Sections of reinforcing inserts in the area of a recess of a level and also in longitudinal views;

FIG. 11: A perspective illustration of a section of another embodiment of a reinforcing insert;

FIG. 12: Another depiction of the reinforcing insert according to FIG. 11; and

FIG. 13: a Cut through a level with a level body according to FIG. 1.

DESCRIPTION OF THE PREFERRED EMBODIMENTS

FIG. 1 shows a body 10 of a level, which is produced by the injection molding of a thermoplastic material that is reinforced by glass fibers or carbon fibers. Preferably polyamide is used as the plastic matrix, in which short or long fibers, e.g., up to a length of 10 mm, are embedded. In order to reduce the amount of plastic to be processed, the body 10 has an I- or double T-profile with a rib 12 and flanges 14, 16 extending from the ends of the rib and perpendicular thereto. Furthermore, reinforcing ribs 18, 20 can extend along the rib 12 between the flanges 14, 16. Furthermore a recess 22 is provided in the upper flange 14, into which recess a bubble level can be placed and/or with which the bubble level can be visually captured. As a result, the recess 22 starts from the outer surface 23 of the upper narrow side of the level body 10, which side is opposite the measurement base 17. The measurement base 17 is the outer surface of the lower rib 12. In the rib 12 also recesses 24, 26 serving as handles are provided, as well as recesses 28, 29, 30 receiving the bubble levels. To this extent, reference is made to customary level constructions.

As an alternative, the rib 12 may also have a wavy geometry, in order to achieve a higher resistance to distortion with the same wall thickness. The wave geometry can be seen in a cut-away view parallel to flanges 14, 16. In the case of a wave-shaped rib, the ribs 18, 20 are basically no longer needed.

A recess corresponding to recess 22 may start from the measurement base 17, in order to be able to receive or visually capture a bubble level.

In order to be able to mold the level body 10 over a long length, for example 600 mm to 2000 mm, without creating impermissibly severe distortion, particularly during the cooling phase, the invention provides that the level body 10 has one or more reinforcing inserts, which are overmolded with thermoplastic material at least in some areas, but preferably entirely.

The inserts simultaneously increase the rigidity of the level body 10 permanently. The reinforcing insert is made of fiber-reinforced plastic, especially polyamide, which is the matrix for the fibers. Particularly such fibers are used, which stretch over the entire length of the reinforcing insert or those sections that are connected to a reinforcing insert. Thus fibers can be present in the form of rovings or textile semi-finished products, such as wovens or fabrics, in the matrix.

Independent thereof, during the overmolding of the reinforcing insert by the fiber-reinforced plastic material of the level body 10 a material connection is achieved between the level body and the reinforcing insert. It is thereby preferably provided that the matrix of the level body 10 matches that of the reinforcing insert. However a design according to which the plastic of the level body 10 forming the matrix does not coincide with that of the reinforcing insert, does not depart from the scope of the invention.

Purely for illustrative purposes, a reinforcing insert 32 is depicted in FIG. 1 in an exploded view, which insert extends along the body 10 and is to be overmolded in the upper flange 14. As is made clear in the depiction of FIG. 1, the reinforcing arrangement 32 consists of four sections, namely the flat sections 29 and 31 extending parallel to and in the flange 14, as well as the shorter flat sections 34, 35 which connect the sections 29, 31 in the area of the recess 22, so that as a result the recess 22 is freely accessible and correspondingly a bubble level can be visually captured.

The reinforcing insert 32—as will be explained in the following figures—can also have other geometries. Independent thereof, the insert should extend along the entire length of the level body 10, which also can be seen in FIG. 1. If the reinforcing arrangement 32 as shown in FIG. 1 is present only in the area of the upper flange 14, the possibility exists of placing a corresponding insert in the level body 10 in the area of the lower flange 16, overmolding the insert.

Various embodiments of the reinforcing inserts are disclosed in the following descriptions of the figures, wherein inserts are shown in FIGS. 2 to 6, which extend in the area of the upper flange 14 from which the rib 12 of the level body starts.

A reinforcing insert 33 can have a rectangular geometry according to FIG. 2. A reinforcing insert can also have the shape of a U-profile 39 (FIG. 5) or a T-profile 41 (FIG. 6).

There is also the possibility of using as reinforcing inserts two separate profile elements 36, 38 and 40, 42 with a rectangular or oval cross-sections, which are overmolded in particular in the lower flange 16 and also, if necessary, in the upper flange 14. In the example, the measurement base 17 of the level is the bottom side or bottom area of the lower flange.

The distance between the profile elements 36, 38 and 40, 42 forming the reinforcing inserts and extending parallel to each other is so selected that the profile elements 36, 38, 40, 42 extend along the side of the recess 22.

If the reinforcing insert with the profile according to FIGS. 2, 5 and 6 extends substantially across the width of the flange 14, measures must be taken to ensure that the recess 2 is not closed. In this regard, appropriate design measures can be seen in FIGS. 7 to 10. A reinforcing strip may consist, for example, of two sections 44, 46, which extend in the longitudinal direction of the level body 10 when viewed in front of and behind the recess 22. The sections 44, 46 may have a profile geometry, which corresponds to those in FIGS. 2, 5 and 6.

In order to guarantee the desired stability of the level body 10 in the area of the recess 22, strip-shaped elements 48, 50 may extend along the side of the recess 22 according to the example of FIG. 9, which elements according to the overhead view of FIG. 9 overlap the edge side of the sections 44, 46 of the reinforcing insert.

If the strip-shaped elements 48, 50 and the sections 44, 46 which together form the reinforcing strip, are positioned at a distance to each other as seen in the example of FIG. 9, then according to the example of FIG. 10 there is also the possibility of connecting the sections 44, 46 as well as the strip-shaped elements 52, 54 extending along the recess 22, such as by welding them. By means of these measures, simple overmolding is possible.

Extending along the flange 14 according to the example of FIG. 8 are rod-shaped reinforcing strips 56, 58, which can correspond to those of FIGS. 3 and 4, wherein at least in the area of the recess 22 transverse braces 60, 62, 64, 66 are present, which connect the reinforcing strips 56, 58 to each other. As a result, high dimensional stability is guaranteed during molding, with the result that the level body 10 has a high level of measurement accuracy.

A section of another embodiment of the reinforcing strip 68, which has a T-profile geometry, can be seen from the cut-away view and perspective view in FIGS. 11 and 12. In the area of the recess 22, the reinforcing strip is interrupted. The sections extending in front of and behind the recess 22, which in principle correspond in terms of their course to those of FIG. 7, are then connected by rods or strips 70, 72, which are connected, such as welded, to the side walls or the underside of the transverse leg 74, as can be seen in FIGS. 11 and 12.

FIG. 13 shows a cut along the line XIII-XIII of a level with a level body 10, namely in the area of the recess 22 through which a bubble level 37 is visible.

As is made clear in the cutaway depiction, the sections 34, 35 of the reinforcing insert 32, which sections connect the sections 29, 31, extend perpendicularly to the flange areas 17, 23. In the cutaway depiction of FIG. 13, a corresponding reinforcing insert is also shown in the area of the lower flange 16.

The level body 10 is preferably made of a thermoplastic material containing long fibers, such as glass fibers or carbon fibers. Carbon-fiber reinforced plastic or glass-fiber reinforced plastic are the preferred materials for the reinforcing inserts, wherein the secondary condition should be satisfied that the modulus of elasticity is significantly greater than that of aluminum.

It should also be pointed out that it is not absolutely necessary that the reinforcing insert extends in each flange of the level body 10 and is overmolded in this area, although this is the preferred method.

There is already sufficient measurement accuracy when a reinforcing insert is overmolded in only one of the flanges, wherein the one in which the bubble level will be inserted is preferred.

Furthermore, the teaching of the invention is not limited to a level body with an I-profile. Plastic levels with other profiles can also comprise the reinforcing inserts of the invention, which as mentioned should extend along the entire or substantially the entire length of the level body and be overmolded with a plastic material.

The concept of the invention is especially suitable for levels with a length between 600 mm and 2000 mm. The preferred length is 1200 mm.

The invention claimed is:

1. A level comprising a level body produced by injection molding a thermoplastic material, said body having at least one recess for constructed and arranged for receiving a position sensor, and a reinforcing insert which is overmolded at least in areas with thermoplastic material, is made of fiber-reinforced plastic and is materially connected with the level body at least in some areas.

2. A level according to claim 1, wherein the reinforcing insert is made of a carbon fiber or glass fiber reinforced plastic, which extend as a unit across substantially the entire length of the reinforcing insert.

3. A level according to claim 2, wherein the reinforcing insert extends along a longitudinal axis of the level body and across a substantially entire length thereof, and along at least one of an upper and a lower longitudinal edge area, which is defined on an exterior side by a measurement base of the level body.

4. A level according to claim 1, wherein the level body is made of a fiber-reinforced plastic, the plastic of the level body matching the plastic of the reinforcing insert.

5. A level according to claim 1, wherein first and second reinforcing inserts or sections of a single reinforcing insert extend in a longitudinal axis direction of the level body, when viewed in front of and behind the recess starting in an area opposite the measurement base.

6. A level according to claim 5, wherein third and fourth reinforcing inserts extend above and/or below and on both sides of the recess in the level body.

7. A level according to claim 6, wherein at least one of the first and second reinforcing inserts is connected to at least one of the third and fourth reinforcing inserts.

8. A level according to claim 6, wherein the third and/or fourth reinforcing inserts, which extend along the sides of the recess, overlap at least in sections the first and/or second reinforcing inserts in the longitudinal axis direction of the level body.

9. A level according to claim 1, wherein the reinforcing insert has two first sections extending in a longitudinal axis direction and along each side of the recess, which sections are connected to second sections extending in a transverse manner thereto.

10. A level according to claim 1, wherein the level body has an I-profile geometry, with upper and lower flanges and a rib connecting the flanges, said reinforcing insert extending in at least one flange.

11. A level according to claim 10, wherein the rib connecting the flanges has a wave-shaped geometry in a cut view along the flanges.

12. A level according to claim 1, wherein a first reinforcing insert is molded in the level body in a longitudinal direction of the level body when viewed in front of and behind the recess for the position sensor starting from an exterior area of a narrow side of the level body opposite the measurement base, and the first reinforcing insert is connected to at least a second reinforcing insert extending to a side of the recess and/or below the recess.

13. A level according to claim 12, wherein the second reinforcing insert extends beneath the position sensor positioned in an offset manner in a direction of the exterior area and placed in the recess.

14. A level according to claim 12, wherein the reinforcing insert and the level body comprise polyamide.

15. A level according to claim 12, wherein the level is constructed in a symmetrical manner with regard to the reinforcing inserts.

16. A level according to claim 1, wherein the reinforcing insert has a modules of elasticity with E>> 80 GPa.

* * * * *